United States Patent
Lu et al.

(10) Patent No.: US 8,676,356 B2
(45) Date of Patent: Mar. 18, 2014

(54) SYSTEM AND METHOD FOR MOTOR PARAMETER ESTIMATION

(75) Inventors: Bin Lu, Kenosha, WI (US); Ting Yan, Brookfield, WI (US)

(73) Assignee: Eaton Corporation, Cleveland, OH (US)

( * ) Notice: Subject to any disclaimer, the term of this patent is extended or adjusted under 35 U.S.C. 154(b) by 1201 days.

(21) Appl. No.: 12/351,582

(22) Filed: Jan. 9, 2009

(65) Prior Publication Data
US 2010/0179692 A1 Jul. 15, 2010

(51) Int. Cl.
*G05B 13/00* (2006.01)

(52) U.S. Cl.
USPC .......... 700/48; 700/40; 700/44; 700/52; 700/108; 700/109

(58) Field of Classification Search
USPC .......... 700/40, 44, 48, 52, 108, 109; 702/179–180
See application file for complete search history.

(56) References Cited

U.S. PATENT DOCUMENTS

| | | | |
|---|---|---|---|
| 6,735,483 B2 * | 5/2004 | Martin et al. | 700/29 |
| 6,829,515 B2 * | 12/2004 | Grimm | 700/108 |
| 7,047,089 B2 * | 5/2006 | Martin et al. | 700/29 |
| 7,149,590 B2 * | 12/2006 | Martin et al. | 700/44 |
| 7,184,902 B2 * | 2/2007 | El-Ibiary | 702/60 |
| 7,526,405 B2 * | 4/2009 | Miller | 702/179 |
| 7,557,702 B2 * | 7/2009 | Eryurek et al. | 340/511 |
| 2005/0007249 A1 * | 1/2005 | Eryurek et al. | 340/511 |
| 2008/0082195 A1 * | 4/2008 | Samardzija | 700/109 |

FOREIGN PATENT DOCUMENTS

WO WO9749977 A1 * 12/1997 ............ G01M 15/00

OTHER PUBLICATIONS

Holtz, J.; Thimm, T., "Identification of the machine parameters in a vector controlled induction motor drive," Industry Applications Society Annual Meeting, 1989., Conference Record of the 1989 IEEE , pp. 601-606 vol. 1, Oct. 1-5, 1989.*

Toliyat, H.A.; Levi, E.; Raina, M., "A review of RFO induction motor parameter estimation techniques," Energy Conversion, IEEE Transactions on , vol. 18, No. 2, pp. 271-283, Jun. 2003.*

* cited by examiner

*Primary Examiner* — Kavita Padmanabhan
*Assistant Examiner* — Christopher E Everett
(74) *Attorney, Agent, or Firm* — Ziolkowski Patent Solutions Group, SC

(57) ABSTRACT

A system and method for determining unknown values of certain motor parameters includes a motor input device connectable to an electric motor having associated therewith values for known motor parameters and an unknown value of at least one motor parameter. The motor input device includes a processing unit that receives a first input from the electric motor comprising values for the known motor parameters for the electric motor and receive a second input comprising motor data on a plurality of reference motors, including values for motor parameters corresponding to the known motor parameters of the electric motor and values for motor parameters corresponding to the at least one unknown motor parameter value of the electric motor. The processor determines the unknown value of the at least one motor parameter from the first input and the second input and determines a motor management strategy for the electric motor based thereon.

25 Claims, 4 Drawing Sheets

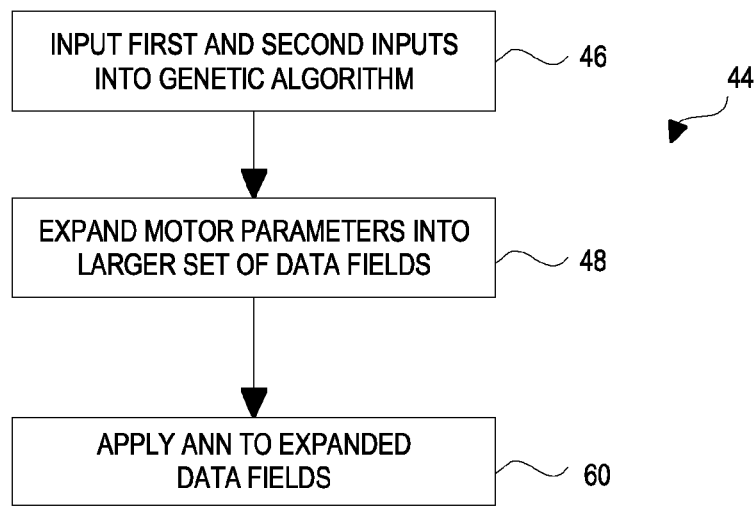
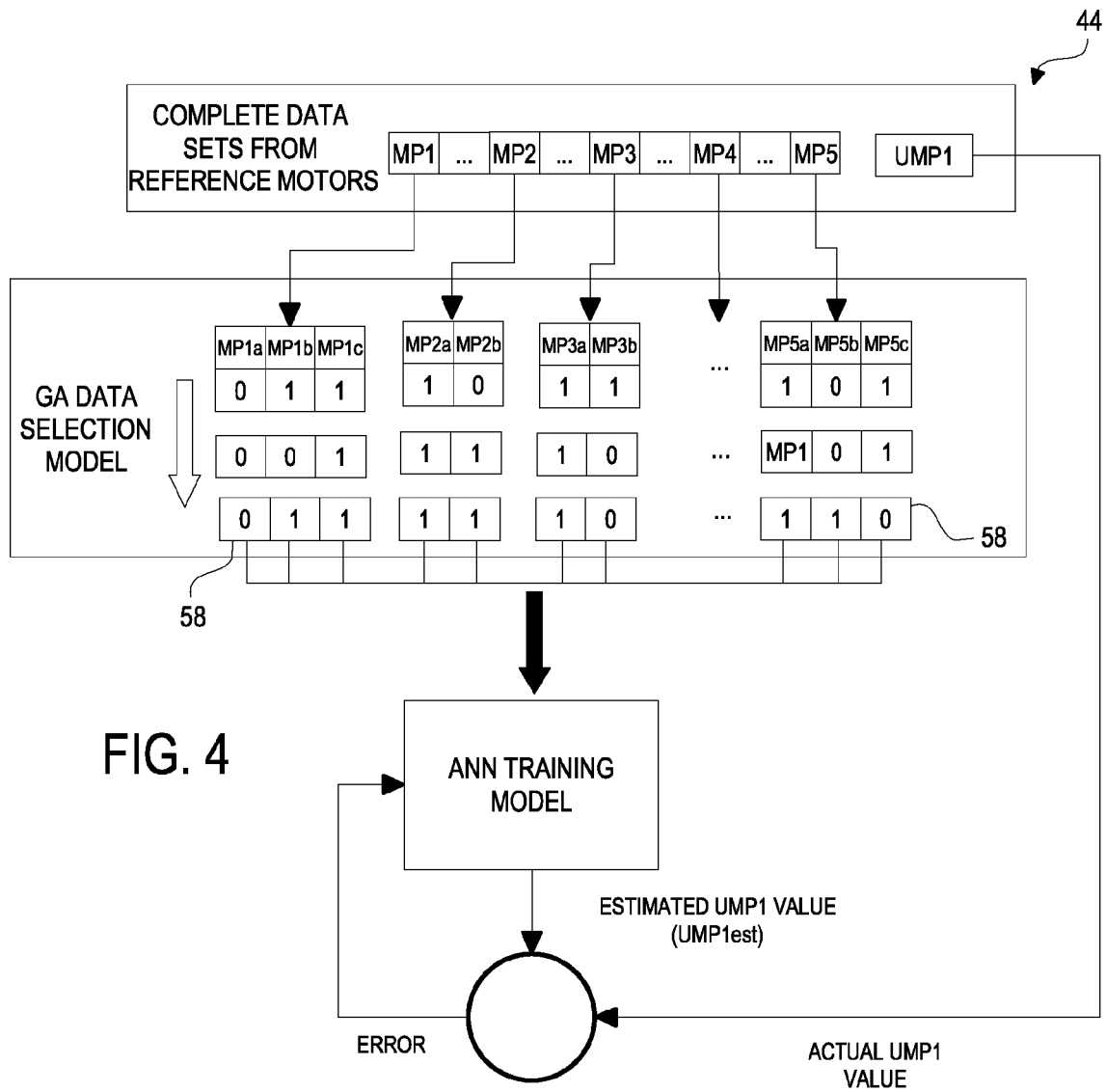

SYSTEM AND METHOD FOR MOTOR PARAMETER ESTIMATION

GOVERNMENT LICENSE RIGHTS

The present invention was made at least in part with Government support under Contract No. DE-FC36-04GO14000, awarded by the United States Department of Energy. The Government may have certain rights in the invention.

BACKGROUND OF THE INVENTION

The present invention relates generally to electric motors and, more particularly, to a system and method for determining unknown values of certain motor parameters for use in developing a motor management strategy.

Electric motors consume a large percentage of generated electricity capacity. Many applications for this "workhorse" of industry are fan and pump industrial applications. For example, in a typical integrated paper mill, low voltage and medium voltage motors may comprise nearly 70% of all driven electrical loads. Due to the prevalence of these motors in industry, it is paramount that the electric motors be operated reliably and efficiently. Motor design parameters and performance parameters are often required by the motor management systems to optimize the control and operations of electric motors. Similarly, motor status monitoring enables the electric motors to operate reliably. Most motor status monitoring techniques also require certain motor design parameters and performance parameters.

In practice, such motor design and performance parameters are often not readily available. Motor nameplate is normally the only source of information that users have access to. However, some motor design and performance parameters are not available in the nameplate, such as the partial-load efficiencies and power factors. In actual industrial fields, the nameplate is often illegible due to dusty and/or greasy environments. The physical location of the motor also can be difficult to access. Many motor manufacturers treat the motor parameters, especially the design parameters, as proprietary information and refuse to release them.

It would therefore be desirable to design a system and method for determining the unknown values of certain motor parameters so as enable the improved motor management and motor status monitoring.

BRIEF DESCRIPTION OF THE INVENTION

The present invention provides a system and method for determining unknown values of certain motor parameters for use in developing a motor management strategy. Known values for a plurality of known motor parameters of a target electric motor are analyzed and compared to motor data on a plurality of reference motors. The motor data for the plurality of reference motors includes values for motor parameters corresponding to the plurality of known motor parameters of the electric motor and values for motor parameters corresponding to at least one unknown motor parameter value of the electric motor. From the analysis and comparison of the target electric motor to the plurality of reference motors, the unknown value of at least one motor parameter for the target electric motor is determined and from the first input and the second input and a motor management strategy is determined.

In accordance with one aspect of the invention, a motor management system includes a motor input device connectable to an electric motor having associated therewith values for a plurality of known motor parameters and an unknown value of at least one motor parameter. The motor input device includes therein a processing unit configured to receive a first input from the electric motor comprising the values for the plurality of known motor parameters for the electric motor and receive a second input comprising motor data on a plurality of reference motors, the motor data for the plurality of reference motors comprising values for motor parameters corresponding to the plurality of known motor parameters of the electric motor and values for motor parameters corresponding to the at least one unknown motor parameter value of the electric motor. The processor is further configured to determine the unknown value of the at least one motor parameter for the electric motor from the first input and the second input and determine a motor management strategy for the electric motor based on the determined value of the at least one motor parameter.

In accordance with another aspect of the invention, a method for operating a target electric motor having a plurality of known motor parameter values and an unknown motor parameter value includes the steps of inputting the plurality of known motor parameters values for the target electric motor into a motor management system and accessing from the motor management system, a collection of motor data from a plurality of reference motors, the motor data for each of the plurality of reference motors comprising motor parameter values corresponding to the plurality of known motor parameters for the target electric motor and a motor parameter value corresponding to the unknown motor parameter value for the target electric motor. The method further includes the steps of determining in the motor management system the unknown motor parameter value for the target electric motor based on the plurality of known motor parameter values for the target electric motor and the motor data on the plurality of reference motors and either controlling operation of the target electric motor or monitoring status of the target electric motor based on the determined motor design parameter.

In accordance with yet another aspect of the invention, a motor input device for providing motor data to an electric motor system is programmed to retrieve partial motor data for a target motor and retrieve at least one motor data set for at least one reference motor similar to the target motor. The motor input device is further programmed to analyze the partial motor data for the target motor and the at least one motor data set for the at least one reference motor similar to the target motor and determine an unknown value of a motor parameter for the target motor based on the analysis of the partial motor data for the target motor and the at least one motor data set for the at least one reference motor similar to the target motor.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIGS. 3-4 graphically illustrate a technique for determining unknown values of certain motor parameters of a target electric motor according to an embodiment of the invention.

DETAILED DESCRIPTION OF THE PREFERRED EMBODIMENT

The embodiments of the invention set forth herein relate to a system and method for determining unknown values of certain motor parameters for use in developing a motor management strategy. The system, which is preferably disposed within a device configured to monitor an operating electric motor, performs an analysis and comparison of the electric motor to a plurality of reference motors to determine an unknown value of at least one motor parameter for the target electric motor.

Figure 1:
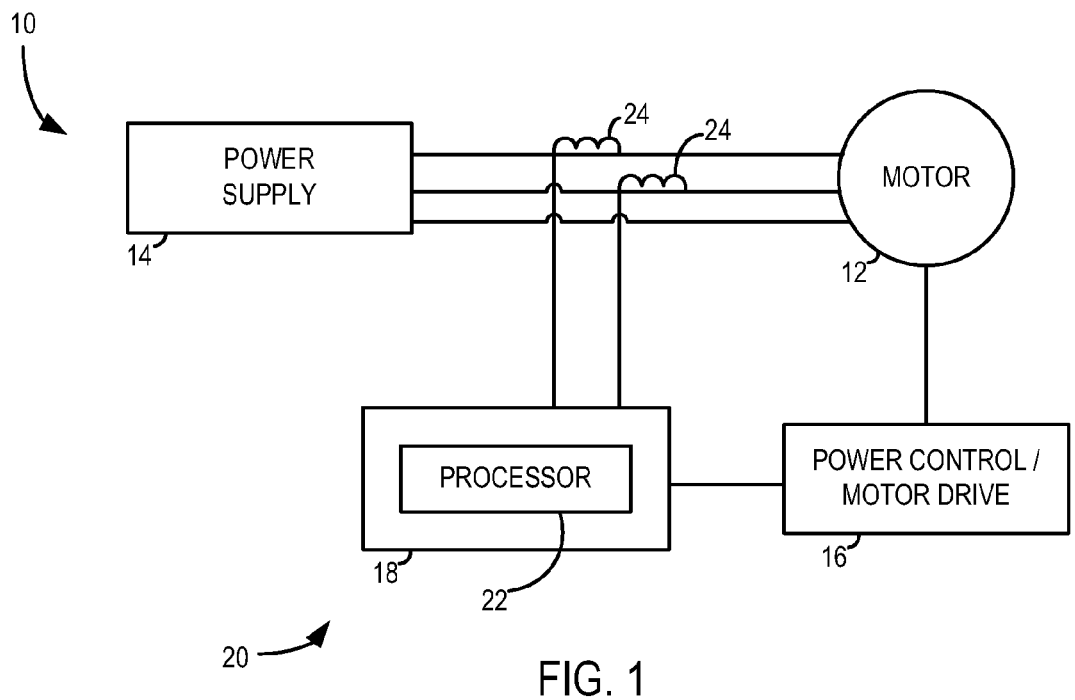
FIG. 1 is a schematic representation of a motor assembly and motor management system according to an embodiment of the invention.

Referring to FIG. 1, a motor assembly 10, such as an electric motor, is shown as configured to drive a load. The motor assembly 10 includes a motor 12 (i.e., a target motor) that receives power from a power supply 14. The motor 12 is coupled to an electronic device such as a power controller, starter, or a variable frequency motor drive 16, which is configured to control power to the motor 12. Attachable to the motor assembly 10 is a motor input device 18 that forms at least part of a motor management system 20. The motor input device 18 includes therein a processor 22 that, as will be described in greater detail below, is programmed to determine unknown values of certain motor parameters of the target motor 12 for use in developing a motor management strategy.

According to the embodiment of FIG. 1, motor input device 18 is in the form of a motor control device configured to monitor (i.e., perform a motor status monitoring), as well as control, operation of the target motor 12 (e.g., control self-tuning of motor drive 16). In such an embodiment, motor input device 18 is configured to provide motor status monitoring. The motor input device 18 can be configured to monitor current input to the motor and/or vibration of the motor, according to known electric motor monitoring systems/techniques. In one embodiment of the invention, and as shown in FIG. 1, the motor input device 18 is configured to monitor current input to the motor, and thus includes current sensors 24 to acquire stator current data from the electric motor. This current data is communicated to processor 22, where the current is analyzed to report motor status. While shown as including current sensors 24 for monitoring operation of target motor 12, it is also recognized that motor input device 18 could be configured for monitoring operation of target motor 12 by way of other sensor input, including vibration, temperature sensors, etc., as set forth above.

According to an exemplary embodiment of the invention, the processor 22 of motor input device 18 is programmed to determine unknown values of certain motor parameters of the target motor 12 for use in developing a motor management strategy. It is recognized that for developing a motor management strategy (i.e., monitoring and controlling operation of the target motor 12) in motor input device 18, it is desirable to have knowledge of values for a plurality of motor parameters for the target motor 12. These motor parameters can include motor nameplate data and can also include other motor design and performance data for the target motor (i.e., non-nameplate motor data). While the motor nameplate data is sometimes readily available to an operator, a complete set of the values of all motor parameters related to motor performance are typically not known or readily available. For example, values may be unknown for some of the following motor design and performance parameters: rated horsepower; rated voltage; rated current; rated speed; enclosure; NEMA design code; stator slot number; rotor bar number; motor rated-load, partial-load efficiencies and power factors; locked-rotor torque, breakdown torque, and full-load torque; no-load current, and locked-rotor current; weight; price; and stator resistance at room temperature. Thus, according to embodiments of the invention, processor 22 is programmed to determine one or more of the unknown values of motor parameters of the target motor 12, such as values of motor parameters related to motor performance.

In determining the unknown values of one or more motor parameters of the target motor 12, the processor 22 receives a plurality of inputs related to the target motor 12 and a plurality of reference motors. The processor 22 receives a first input related to the target motor 12 that provides partial motor data for the target motor. That is, the first input includes therein values for known motor parameters of the target motor. The values for these known motor parameters include motor nameplate data and can also include therein partial motor performance data for the target motor. The first input to the processor 22 can be by way of a manual input of the values for the known motor parameters by an operator by way of motor input device 18. Alternatively, the first input to the processor 22 can be by way of a retrieval of the values for the known motor parameters of the target motor from a collection of motor data/motor parameters accessible by, or stored on, the processor. For example, the first input could be retrieved by processor 22 from a collection of motor parameters maintained by a motor manufacturer or plant that is stored on the processer or accessed thereby. According to one embodiment, the processor 22 retrieves motor nameplate data (i.e., values for motor parameters included on the nameplate) for the target motor 12, as well as any motor performance data for the target motor (i.e., values for any known motor parameters related to motor performance). As set forth above, the first input provides only partial motor data for the target motor, as not all values for motor parameters related to design and performance data of the target motor are available for input into processor 22 of motor input device 18.

The processor 22 also receives a second input that contains motor data on a plurality of reference motors. The motor data for the plurality of reference motors includes values for motor parameters corresponding to the plurality of known motor parameters of the electric motor and further includes values for motor parameters corresponding to at least one unknown motor parameter value of the electric motor. The motor data for the plurality of reference motors can be by way of a manual input of the values or can be received from a collection of motor data/motor parameters that is stored on the processer 22 or accessed thereby. These motor data may include at least one of the following parameters from a plurality of motors: rated horsepower; rated voltage; rated current; rated speed; enclosure; NEMA design code; stator slot number; rotor bar number; motor rated-load, partial-load efficiencies and power factors; locked-rotor torque, breakdown torque, and full-load torque; no-load current, and locked-rotor current; weight; price; and stator resistance at room temperature.

Based on the receipt/retrieval of the first and second inputs via user input and/or accessing a collection of motor data/motor parameters, the processor 22 is programmed to determine the unknown value of a specified motor parameter for the target motor 12. As the motor design and performance data for the target motor 12 and each of the reference motors (including both nameplate data and non-nameplate data) are directly or indirectly related to the motor's design structure, a statistical analysis and comparison of the motor design and performance data for the target motor 12 and each of the reference motors allows for a determination or estimation of the unknown value of a specified motor parameter for the target motor 12. That is, motors having similar/identical motor parameter values should also have similar/identical design structures.

Figure 2:
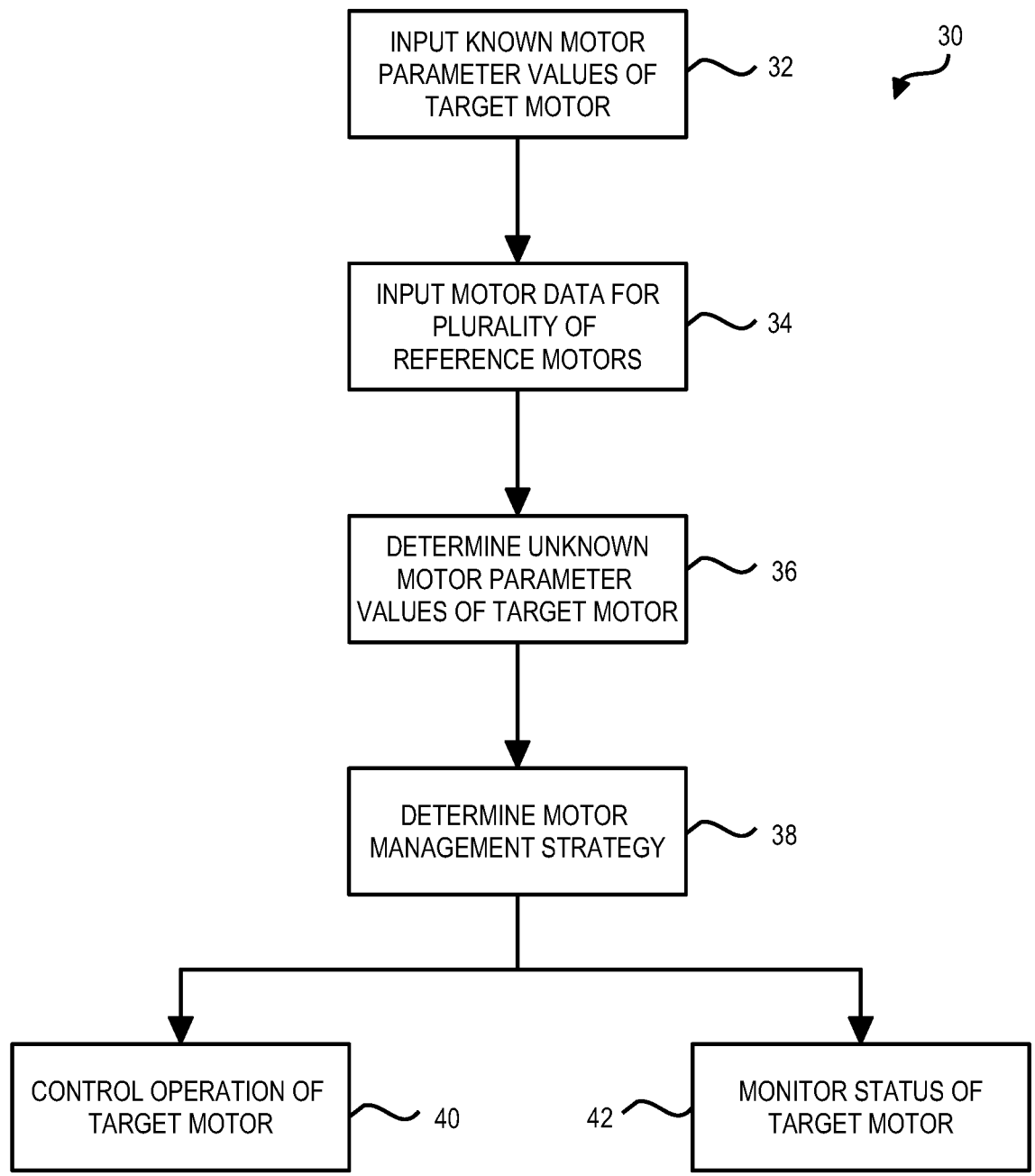
FIG. 2 is a flow chart illustrating a technique for determining unknown values of certain motor parameters of a target electric motor and determining a motor management strategy according to an embodiment of the invention.

Referring now to FIG. 2, a computer or processor implemented technique 30 is set forth for determining one or more of the unknown values of motor parameters of the target electric motor for use in determining a motor management strategy. The technique 30 is initiated at STEP 32 where known values for a plurality of motor parameters for the target electric motor are input into a motor management system. The values for these known motor parameters include motor nameplate data and can also include therein partial motor design and performance data (i.e., non-nameplate motor data) for the target motor. The input of the motor parameters is achieved by way of a receipt or retrieval of the motor parameters. That is, the known values of the motor parameters are retrieved/received as a first input and can be received by way of a manual input or be retrieved from a collection of motor data/motor parameters accessible by (or stored on) the processor. As not all motor parameter values are known for the target electric motor (e.g., non-nameplate motor data), the first input to the motor management system of the values of known motor parameters is considered to be partial motor data of the target motor.

In addition to inputting the plurality of known motor parameters values for the target electric motor into the motor management system, motor data on a plurality of reference motors are input into the motor management system. That is, at STEP 34, a collection of motor data having motor data on a plurality of reference motors is accessed by the motor management system. The motor data for the plurality of reference motors includes values for motor parameters corresponding to the plurality of known motor parameters of the target electric motor and further includes values for motor parameters corresponding to at least one unknown motor parameter value of the electric motor. The motor data for the plurality of reference motors is accessed and retrieved from the collection of motor data accessible by the motor management system.

At STEP 36, the unknown motor parameter value(s) for the target electric motor are determined based on the plurality of known motor parameter values for the target electric motor and the motor data on the plurality of reference motors. More specifically, motor data for at least one reference motor similar to the target motor is selected and analyzed from the plurality of reference motors. The known motor parameter values of the target electric motor are then analyzed and compared to the motor data for the similar/selected reference motor(s), which includes similar values for the known motor parameters as those in the target electric motor and further includes values for motor parameters corresponding to at least one unknown motor parameter value of the electric motor. Based on this comparison and analysis of the motor parameters of the target electric motor and the similar/selected reference motor(s), the unknown motor parameter value(s) for the target electric motor are determined.

Upon determination of the unknown motor parameter value(s) for the target electric motor, a motor management strategy for the target electric motor is determined at STEP 38. The motor management strategy for the target electric motor is based, at least in part, on the determined value of the at least one motor parameter. The motor management strategy can include controlling operation of the target electric motor (i.e., determining operational settings, tuning the motor drive) at STEP 40 and/or can include status monitoring of the target electric motor at STEP 42.

It is recognized that several approaches can be taken to determine the unknown motor parameter value(s) for the target electric motor at STEP 36. Two of these approaches are shown and described in FIGS. 3-6, and can be used independently from one another, or in conjunction with each other, in order to determine the unknown motor parameter value(s). Referring to FIGS. 3-4, an exemplary method 44 of analysis and comparison of the target motor 12 (FIG. 1) and selected reference motors for determining the unknown value of a specified motor parameter for the target motor is shown according to an embodiment of the invention. The method 44 makes use of genetic algorithms (GA) and artificial neural networks (ANN) for determining the unknown value of a specified motor parameter for the target motor 12. Initially, values for known motor parameters of the target motor and motor data from the reference motors, including values for motor parameters corresponding to the plurality of known motor parameters of the electric motor and values for motor parameters corresponding to the unknown motor parameter value(s) of the target electric motor, are input to the GA. The GA model is used to improve the diversity of the input data fields (i.e., the motor parameters of the first and second inputs) by creating variations of the original set of known parameters using math transforms, thereby helping improve the accuracy in determining the unknown motor parameter value(s). Additionally, the GA model can address problems associated with non-linear estimation in cases where the unknown parameter has a highly nonlinear relationship with the known motor parameters. Upon expansion of the input data fields, an ANN model is then used to extract the relationship between the unknown motor parameter(s) and the rest of the motor parameters.

In determining the unknown motor parameter values for the target motor 12, the first and second inputs received/retrieved by the processor 22 are input into the GA at STEP 46. The key operators in the GA computation include reproduction, crossover, and mutation. The GA is implemented by firstly assigning each unknown motor parameter a random binary code (string). A population of strings can be generated through repeating this procedure. Reproduction involves a process that each string is assessed against predetermined criteria of fitness (fitness function). The fitters are more likely to survive and to produce offspring in the next generation. Crossover represents mating and swapping of some information of the two strings that are also randomly selected from the survivors of the selection process. Mutation occurs to one randomly selected string to invert its binary code from 0 to 1, or vice versa. By manipulating the degree of each process involving the three operators, some global optimal solutions from the population can be achieved.

To improve the diversity of the input data fields and improve the ANN training convergence, the "raw" motor parameters from are first expanded into a larger set of data fields at STEP 48 through a list of data transformations. For example, in FIG. 4 a motor parameter, MP1, is expanded into three fields $MP1_a$, $MP1_b$, $MP1_c$ using a plurality of mathematical functions. Although ANN is capable of handling nonlinear systems, a proper data preprocessing can greatly reduce the non-linearity of the system and improve the convergence speed. Then, a binary data field enabler 58, either 0 or 1, is randomly assigned to each data field to represent whether it is included in the ANN training or not. Depending on the number of expanded data fields, a multi-bit string is formed. This random binary string is used as an "individual" in the GA. The same process is repeated to form a population with random individuals, as the initialization stage of the GA. In an exemplary embodiment, the following settings/limits are employed in the GA: iteration mechanisms having a maximum population size of twice the expanded data fields, a maximum of 50 generations allowed during variable selection, a tolerance per generation of 0.001, uniform selection with a quantization level of 100, stochastic multipoint crossover with a probability 0.7, uniform mutation with a high mutation factor of 1.0 to keep algorithm "awake," and proportional fitness scaling. After the initial runs, parameter normalization is applied and simple penalty functions are used to maintain sensible operation, such that the most correlated data fields are selected by the GA.

As shown in FIGS. 3-4, in the proposed method, a standard multi-layer feed-forward ANN model is applied at STEP 60 to estimate the value of one or more unknown motor parameters UMP1, using expanded data fields selected by the GA data selection model. It is recognized, however, that other ANN structures other than a feed-forward model could also be used, such as "recurrent networks" (e.g. Hopfield Network and Hamming Network, etc.). According to an exemplary embodiment, the structure of the ANN model, such as the number of hidden layer nodes, is determined by applying a constructive method, commonly referred as "cascade-correlation learning" (i.e., applying a cascade correlation algorithm), which starts a training of the ANN with a small network with less nodes and adds one hidden node each time until the model converges. It is also recognized that the structure/training of the ANN can be set by way of additional methods, such as back propagation or similar techniques. Upon training of the ANN model, an estimate of the unknown motor parameter value UMP1$_{est}$ is output by the model. As shown in FIG. 4, according to an embodiment of the invention, the error between the estimated value and the actual UMP1 value can be fed back to the ANN model to update the ANN parameters (to train the ANN model.)

As shown in FIG. 4, the ANN model is implemented to output a single unknown motor parameter estimation UMP1$_{est}$. In such an embodiment, a separate ANN model could then be implemented to estimate each additional unknown motor parameter (UMP2, UMP3 . . . UMPn). However, it is recognized that a single ANN model could be trained/configured to estimate a plurality of unknown motor parameters UMP1, UMP2, UMP3 . . . UMPn. In such an embodiment, the ANN model would output a plurality of unknown motor parameter estimations UMP1$_{est}$, UMP2$_{est}$, UMP3$_{est}$, . . . , based on the expanded data fields selected by the GA data selection model. It is recognized that the input data fields and model structures in the ANN training could be different from the GA and that classification models, instead of prediction models, would then be used to keep the estimated values of the unknown motor parameter(s) within the existing group of values of those motor parameter(s) in the reference motors.

Based on the relationship between the commonly known motor parameters of the target motor and the reference motors, the GA-ANN model described above is able to determine a relationship between the unknown motor parameter value(s) of the target electric motor and the value(s) of corresponding motor parameters of the reference motors that are known, as shown in FIG. 4. For example, based on a relationship between known values of rated horsepower; rated voltage; rated current; rated speed; enclosure; NEMA design code (and additional motor parameters) for the target electric motor and the reference motors, the GA-ANN model is able to determine a relationship between the motor rated-load and partial-load efficiencies and power factors; locked-rotor torque, breakdown torque, and full-load torque; stator slot number; rotor bar number; no-load current, and locked-rotor current, etc., for the target electric motor and the reference motors when such motor parameters are known for the reference motors and unknown for the target motor. Based on this relationship, the unknown motor parameter values for the target electric motor are determined.

While the method 44 described above includes the use of both a GA and an ANN, it is recognized that the known motor parameters from the target motor and the reference motors can be directly fed into the ANN model, without employing a GA model. That is, it is recognized that values for known motor parameters of the target motor and motor data from the reference motors, including values for motor parameters corresponding to the plurality of known motor parameters of the electric motor and values for motor parameters corresponding to the unknown motor parameter value(s) of the target electric motor, can be plugged directly into the ANN model. The ANN model can then extract the relationship between the unknown motor parameter(s) and the rest of the motor parameters to estimate or determine the unknown value of at least one motor parameter.

Figure 5:
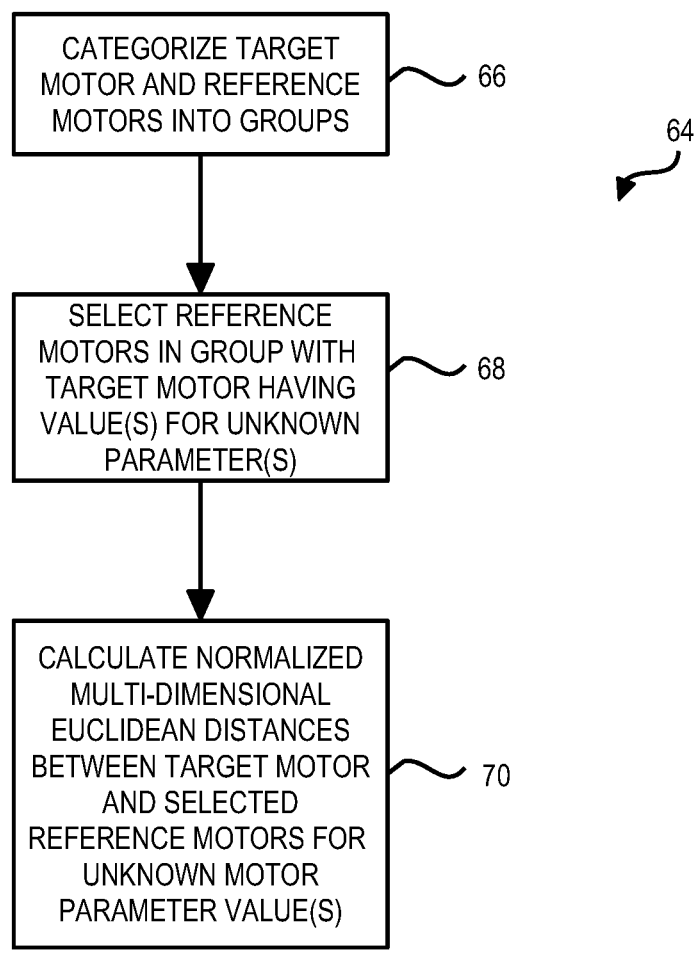
FIGS. 5-6 graphically illustrate a technique for determining unknown values of certain motor parameters of a target electric motor according to another embodiment of the invention.
Figure 6:
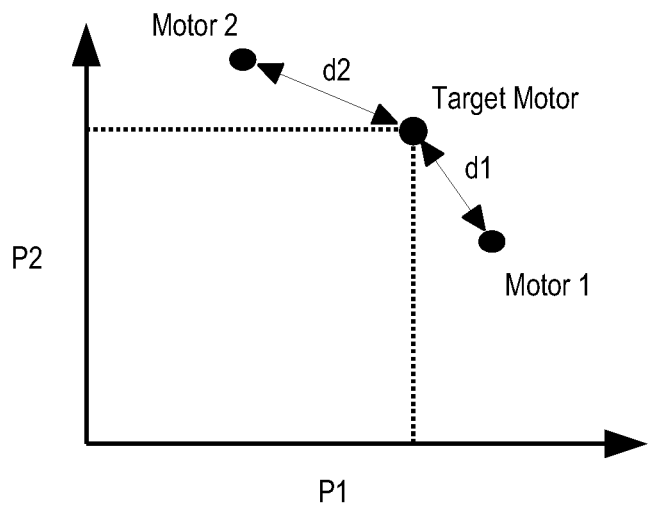

Referring now to FIG. 5-6, a method 64 of analysis and comparison of the target motor 12 (FIG. 1) and selected reference motors for determining the unknown value of a specified motor parameter for the target motor 12 is shown according to another embodiment of the invention. The method 64 makes use of a proximity-based algorithm to determine the unknown value of a specified motor parameter for the target motor. According to an exemplary embodiment, the proximity-based algorithm denotes the unknown motor parameter(s) (i.e., parameters having an unknown value) for the target motor to be estimated as parameter x. The collection of motor data provides data on a collection of reference motors with known values for parameter x. Values for a set of parameters that are known for the target motor as well as for each reference motor in the collection of motor data are denoted as parameter set, P. As shown in FIG. 5, according to the proximity-based algorithm analysis, both the target motor and the reference motors are categorized into groups at STEP 66 based on some discrete motor parameters and other motor parameters with a small number of possible values in their nameplate information. The set of such motor parameters are denoted as D (a subset of P). If the values for all parameters in D are the same for two motors, they belong to the same group.

According to the proximity-based algorithm analysis, reference motors with known parameter x in the same group as the target motor are selected at STEP 68 for further processing. If all these motors in the same group have the same value for parameter x, this value is taken as the estimated value of the unknown parameter x for the target motor with likelihood of 1. If all the motors in the same group do not have the same value for parameter x, then it is assumed that parameter x may have multiple possible values. In this case, the normalized multi-dimensional Euclidean distances for a selected set of parameters, denoted as C (a subset of P), are calculated between the target motor and the motors with known values for parameter x at STEP 70. These parameters in C are selected based on empirical knowledge. The likelihood that the target motor takes one of the possible values for parameter x is inversely proportional to the square of the calculated distance between the target motor and the motor with this value of parameter x. FIG. 6 shows the distances $d_1$, $d_2$ between two motors with different known values for parameter x and the target motor, when only two parameters P1 and P2 are selected for C. Note that the two dimensions with different units are normalized based on the values of the two parameters of the target motor. Based on the distances, the proposed algorithm gives a larger likelihood number for the value of Motor 1's parameter x, since it is closer to the target motor than Motor 2.

A more formal description of the proposed algorithm is given as follows. The values for parameters in C of the target motor are denoted as $V_1$, $V_2$, ..., $V_J$, where J denotes the number of parameters in set C. All possible values for parameter x are then denoted as $X_1$, $X_2$, ..., $X_I$, and the corresponding sets of motors in the same group as the target motor as $M_1$, $M_2$, ..., $M_I$, in which, any motor m in $M_i$ ($1 \leq i \leq I$) has a known value $X_i$ for parameter x, with I denoting the number of possible values for parameter x in the group. Then for the target motor, the likelihood that its parameter x takes value $X_i$, denoted as $L_i$, can be calculated based on the following formulae:

$$L_i = \frac{L'_i}{\sum_{i=1}^{I} L'_i}, \quad \text{[Eqn. 1]}$$

in which $$L'_i = \sum_{m \in M_i} \frac{1}{\delta + \sum_{j=1}^{J} \frac{(V_j - V_{j,m})^2}{V_j^2}}. \quad \text{[Eqn. 2]}$$

In the above formulae, δ is a very small number to avoid the denominator to be 0, and $V_{j,m}$ is the j-th parameter of motor m. The physical implication of the formulae is that, for set $M_i$, in which all motors have the same value $X_i$ for parameter x, the associated likelihood that the target motor has value $X_i$ for parameter x, is proportional to the sum of the reciprocals of the distances between all the motors in set $M_i$ and the target motor. The first formula is to guarantee that the sum of the likelihood values for all possible values for parameter x normalizes to 1. Different dimensions, or parameters, are divided by $V_j$ for normalization.

Based on the above calculations, the proximity-based algorithm method/model is able to determine the unknown motor parameter value(s) for the target electric motor. As set forth above, the determined unknown motor parameter value(s) can include: rated horsepower; rated voltage; rated current; rated speed; enclosure; NEMA design code; stator slot number; rotor bar number; motor rated-load, partial-load efficiencies and power factors; locked-rotor torque, breakdown torque, and full-load torque; no-load current, and locked-rotor current; weight; price; and stator resistance at room temperature. Upon determination of the unknown motor parameter value(s), a motor management strategy can then be determined.

While GA-ANN and proximity based methods are set forth above for estimating the unknown value of at least one motor parameter for the target electric motor, it is recognized that additional parameter estimation methods could be implemented according to additional embodiments of the invention. These parameter estimation methods can be based on, but not limited to, techniques including: data mining; pattern recognition including supervised and unsupervised learning, clustering, classifiers; and model-based prediction and regression.

Figure 7:
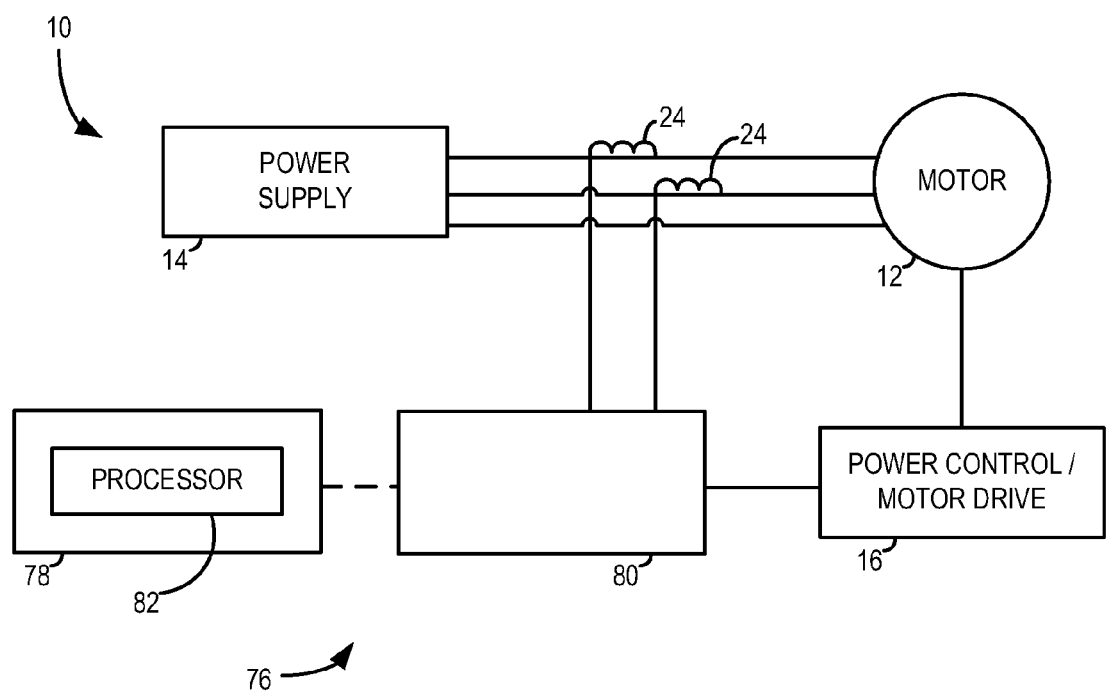
FIG. 7 is a schematic representation of a motor assembly and motor management system according to an embodiment of the invention.

Referring now to FIG. 7, a motor management system 76 is shown for monitoring a motor assembly 10 according to another embodiment of the invention. The motor management system 76 includes therein a motor input device 78 and a motor control device 80 configured to monitor (i.e., perform a motor status monitoring), as well as control, operation of the target motor 12. As shown in FIG. 7, the motor input device 78 is in the form of a unit that is separate from the motor control device 80, as compared to the embodiment of FIG. 1 where the motor input device is integrated with the motor control device.

According to the embodiment of FIG. 7, the motor input device 78 includes a processor 82 therein and may be in the form of a computing device located remotely from the motor assembly 10 and motor control device 80 and be configured to transmit data (e.g., wireless data transmission) thereto. That is, as set forth in detail above with respect to FIGS. 2-6, the processor 82 of motor input device 78 is programmed to determine unknown values of certain motor parameters of the target motor 12 for use in developing a motor management strategy. In the embodiment shown in FIG. 7, motor input device 78 determines the unknown values of one or more motor parameters of the target motor 12 and then transmits those values to the motor control device 80. The motor control device 80 then separately develops and implements a motor management strategy for monitoring and controlling operation of the target motor 12, such as by performing a motor status monitoring and/or setting operational parameters for the motor.

A technical contribution for the disclosed method and apparatus is that it provides for a computer implemented technique for determining unknown values of certain motor parameters for use in developing a motor management strategy. The technique receives motor parameters values for the target electric motor and a plurality of reference motors and performs an analysis and comparison of the motor parameter values to determine an unknown value of at least one motor parameter for the target electric motor.

Therefore, according to one embodiment of the present invention, a motor management system includes a motor input device connectable to an electric motor having associated therewith values for a plurality of known motor parameters and an unknown value of at least one motor parameter. The motor input device includes therein a processing unit configured to receive a first input from the electric motor comprising the values for the plurality of known motor parameters for the electric motor and receive a second input comprising motor data on a plurality of reference motors, the motor data for the plurality of reference motors comprising values for motor parameters corresponding to the plurality of known motor parameters of the electric motor and values for motor parameters corresponding to the at least one unknown motor parameter value of the electric motor. The processor is further configured to determine the unknown value of the at least one motor parameter for the electric motor from the first input and the second input and determine a motor management strategy for the electric motor based on the determined value of the at least one motor parameter.

According to another embodiment of present invention, a method for operating a target electric motor having a plurality of known motor parameter values and an unknown motor parameter value includes the steps of inputting the plurality of known motor parameters values for the target electric motor into a motor management system and accessing from the motor management system, a collection of motor data from a plurality of reference motors, the motor data for each of the plurality of reference motors comprising motor parameter values corresponding to the plurality of known motor parameters for the target electric motor and a motor parameter value corresponding to the unknown motor parameter value for the target electric motor. The method further includes the steps of determining in the motor management system the unknown motor parameter value for the target electric motor based on the plurality of known motor parameter values for the target electric motor and the motor data on the plurality of reference motors and either controlling operation of the target electric motor or monitoring status of the target electric motor based on the determined motor design parameter.

According to yet another embodiment of the present invention, a motor input device for providing motor data to an electric motor system is programmed to retrieve partial motor data for a target motor and retrieve at least one motor data set for at least one reference motor similar to the target motor. The motor input device is further programmed to analyze the partial motor data for the target motor and the at least one motor data set for the at least one reference motor similar to the target motor and determine an unknown value of a motor parameter for the target motor based on the analysis of the partial motor data for the target motor and the at least one motor data set for the at least one reference motor similar to the target motor.

The present invention has been described in terms of the preferred embodiment, and it is recognized that equivalents, alternatives, and modifications, aside from those expressly stated, are possible and within the scope of the appending claims.

What is claimed is:

1. A motor management system comprising:
   a motor input device connectable to an electric motor having associated therewith values for a plurality of known motor parameters and an unknown value of at least one motor parameter, the motor input device including therein a processing unit configured to:
      receive a first input from the electric motor comprising the values for the plurality of known motor parameters for the electric motor;
      receive a second input comprising motor data on a plurality of reference motors that are different motors than the electric motor, the motor data for the plurality of reference motors comprising values for motor parameters corresponding to the plurality of known motor parameters of the electric motor and values for motor parameters corresponding to the at least one unknown motor parameter value of the electric motor;
      determine the unknown value of the at least one motor parameter for the electric motor from the first input and the second input, such that the unknown value of the at least one motor parameter for the electric motor is determined from values of motor parameters from one or more of the plurality of reference motors corresponding to the plurality of known motor parameters of the electric motor and values of motor parameters from one or more of the plurality of reference motors of the same type as the at least one unknown motor parameter value of the electric motor; and
      determine a motor management strategy for the electric motor based on the determined value of the at least one motor parameter.

2. The motor management system of claim 1 wherein the motor input device comprises a motor control device configured to determine an operational setting of the electric motor based on the determined value of the at least one motor parameter.

3. The motor management system of claim 1 wherein the motor input device comprises a motor control device configured to perform a motor status monitoring of the electric motor based on the determined value of the at least one motor parameter.

4. The motor management system of claim 1 wherein the processing unit is further configured to apply a neural network to the motor parameter values in the first and second inputs to determine the unknown value of the at least one motor parameter for the electric motor.

5. The motor management system of claim 1 wherein the processing unit is further configured to:
   expand the motor parameter values in the first and second inputs into a set of data fields by way of a genetic algorithm; and
   apply a neural network to the set of data fields to determine the unknown value of the at least one motor parameter for the electric motor.

6. The motor management system of claim 1 wherein the processing unit is further configured to:
   form a motor group from the electric motor and a portion of the plurality of reference motors;
   identify reference motors in the motor group having motor data that includes the values for motor parameters corresponding to the at least one unknown motor parameter value of the electric motor; and
   calculate normalized multi-dimensional distances for a selected set of motor parameters between the electric motor and the identified reference motors to determine the unknown value of the at least one motor parameter for the electric motor.

7. The motor management system of claim 1 wherein the processing unit is further configured to:
   store a collection of motor data including therein the motor data on the plurality of reference motors; and
   retrieve the motor data from the stored collection of motor data to receive the second input.

8. The motor management system of claim 1 wherein the processing unit is further configured to access a remote collection of motor data including therein the motor data on the plurality of reference motors in order to receive the second input.

9. The motor management system of claim 1 wherein the unknown motor parameter comprises at least one of: rated voltage; rated current; rated speed; enclosure; NEMA design code; stator slot number; rotor bar number; motor rated-load, partial-load efficiencies and power factors; locked-rotor torque, breakdown torque, and full-load torque; no-load current, and locked-rotor current; weight; price; and stator resistance at room temperature.

10. The motor management system of claim 1 wherein the known motor parameters of the electric motors comprise at least one of motor design parameters and motor performance data.

11. The motor management system of claim 10 wherein the at least one of the motor design parameters and motor performance data comprises motor nameplate data.

12. The motor management system of claim 1 wherein the processing unit is further configured to select one or more motors from the plurality of reference motors having motor parameter values similar to values of the plurality of known motor parameters of the electric motor.

13. A method for operating a target electric motor having a plurality of known motor parameter values and an unknown motor parameter value, the method comprising:
- inputting the plurality of known motor parameters values for the target electric motor into a motor management system;
- accessing from the motor management system, a collection of motor data from a plurality of reference motors that are different motors than the target electric motor, the motor data for each of the plurality of reference motors comprising motor parameter values corresponding to the plurality of known motor parameters for the target electric motor and a motor parameter value corresponding to the unknown motor parameter value for the target electric motor;
- determining in the motor management system the unknown motor parameter value for the target electric motor based on the plurality of known motor parameter values for the target electric motor and the motor data on the plurality of reference motors, including using from the motor data a value of a motor parameter for one or more of the plurality of reference motors that is the same parameter as the unknown motor parameter for the target electric motor; and
- either controlling operation of the target electric motor or monitoring status of the target electric motor based on the determined motor design parameter.

14. The method of claim 13 wherein controlling operation of the target electric motor comprises setting operational parameters in the target electric motor based on the determined parameter.

15. The method of claim 13 wherein monitoring status of the target electric motor comprises detecting a fault condition in the electric motor based on the determined parameter.

16. The method of claim 13 wherein accessing the collection of motor data comprises one of accessing a collection of motor data stored on the motor management system and remotely accessing a collection of motor data.

17. The method of claim 13 wherein determining the unknown motor parameter value for the target electric motor comprises one of:
- determining the unknown motor parameter value by way of an artificial neural network; and
- determining the unknown motor parameter value by way of a proximity-based algorithm.

18. The method of claim 13 wherein the unknown motor parameter value comprises a value for at least one of rated voltage; rated current; rated speed; enclosure; NEMA design code; stator slot number; rotor bar number; motor rated-load, partial-load efficiencies and power factors; locked-rotor torque, breakdown torque, and full-load torque; no-load current, and locked-rotor current; weight; price; and stator resistance at room temperature.

19. The method of claim 13 wherein inputting the plurality of known motor parameters values comprises inputting motor nameplate data for the target electric motor into the motor management system.

20. The method of claim 13 further comprising:
- forming a motor group from the target electric motor and a portion of the plurality of reference motors;
- identifying reference motors in the motor group having motor data that includes the values for motor parameters corresponding to the at least one unknown motor parameter value of the target electric motor; and
- calculating normalized multi-dimensional distances for a selected set of motor parameters between the target electric motor and the identified reference motors to determine the unknown value of the at least one motor parameter for the target electric motor.

21. A motor input device for providing motor data to an electric motor system, the motor input device programmed to:
- retrieve partial motor data for a target motor;
- retrieve at least one motor data set for at least one reference motor similar to the target motor but that is not the same motor as the target motor, the at least one motor data set including motor parameter values corresponding to a plurality of known motor parameters for the target motor included in the retrieved partial motor data and also including a value for a motor parameter for which a value of the same said motor parameter is not known for the target motor;
- analyze the partial motor data for the target motor and the at least one motor data set for the at least one reference motor similar to the target motor; and
- determine the unknown motor parameter value for the target motor based on the analysis of the partial motor data for the target motor and the at least one motor data set for the at least one reference motor similar to the target motor.

22. The motor input device of claim 21 further programmed to determine an operational setting of the electric motor system based on the determined value of the motor parameter.

23. The motor input device of claim 21 further programmed to perform a motor status monitoring of the electric motor based on the determined value of the motor parameter.

24. The motor input device of claim 21 wherein the unknown value of the motor parameter value comprises a value for at least one of rated voltage; rated current; rated speed; enclosure; NEMA design code; stator slot number; rotor bar number; motor rated-load, partial-load efficiencies and power factors; locked-rotor torque, breakdown torque, and full-load torque; no-load current, and locked-rotor current; weight; price; and stator resistance at room temperature.

25. The motor input device of claim 21 further programmed to access a collection of motor data comprising motor data sets for each of a plurality of reference motors.

* * * * *